United States Patent
Gantillon et al.

(10) Patent No.: US 6,512,078 B1
(45) Date of Patent: Jan. 28, 2003

(54) PROCESS FOR MANUFACTURING POLYESTER

(75) Inventors: Barbara Gantillon, Bessemau (FR); Jean-Luc Lepage, Francheville (FR); Timothy McKenna, Lyons (FR); Véronique Pasquet, Lyons (FR); Roger Spitz, Lyons (FR)

(73) Assignee: Rhodia Ster S.A., Sao Paulo (BR)

( * ) Notice: Subject to any disclaimer, the term of this patent is extended or adjusted under 35 U.S.C. 154(b) by 0 days.

(21) Appl. No.: 09/856,658

(22) PCT Filed: Nov. 25, 1999

(86) PCT No.: PCT/BR99/00098

§ 371 (c)(1),
(2), (4) Date: Oct. 25, 2001

(87) PCT Pub. No.: WO00/32675

PCT Pub. Date: Jun. 8, 2000

(30) Foreign Application Priority Data

Nov. 27, 1998 (FR) .............................. 98 15165

(51) Int. Cl.[7] .............................. C08G 63/02
(52) U.S. Cl. ...................... 528/272; 528/271
(58) Field of Search ................. 528/271, 272

(56) References Cited

FOREIGN PATENT DOCUMENTS

EP 0807655 A1 11/1997 ........... C08G/63/80

Primary Examiner—Terressa M. Boykin
(74) Attorney, Agent, or Firm—Darby & Darby

(57) ABSTRACT

The present invention refers to the production of a polyester-type polymer and more particularly to the solid phase condensation of a polyester. The invention presents a process for manufacturing polyester which comprises at least the following steps: a) esterifying of transesterifying a carboxylic diacid or a carboxylic acid diester with a diol, b) prepolymerizing the esterification or transesterification product in liquid phase until an average degree of polymerization between 10 and 50, preferably between 20 and 45, c) preparing a dispersion of the prepolymer in a non-solvent of diol and non-swelling of the prepolymer liquid, the prepolymer being present in the dispersion in the form of solid particles having diameters under 2 mm and crystallized, with a crystalline lamella thickness under 17 nm, d) polymerizing in dispersed solid phase, e) recovering solid particles. The accomplishment of a dispersed solid phase polymerization permits improving the reaction kinetics. To obtain this improvement, the dispersed solid phase polymerization must be effected with a prepolymer having a particular degree of polymerization properties, of solid particle sizes and of crystalline qualities of the solid.

41 Claims, No Drawings

PROCESS FOR MANUFACTURING POLYESTER

The present invention refers to the production of a polyester-type polymer and particularly to the solid phase condensation of a polyester.

The main method to obtain polyester-type polymers consists in a high-temperature condensation either of the esterification product of a carboxylic diacid and a diol or the transesterification product of a diester and a diol. This condensation is effected in molten state. For the obtention of poly(ethylene terephthalate) (PET), the product of the transesterification of methyl terephthalate (DMT) and ethylene glycol (EG) or the esterification product of purified terephthalic acid (PTA) and ethylene glycol. The condensation is carried out until the obtention of a compound having the desired molecular weight. This condensation cannot lead to polymers having a very high viscosity index, specifically above 85 ml/g. Above such a viscosity, the type of technology presently employed does not permit the continuation of the reaction. If the obtention of a high molecular weight is desired, it is however necessary to carry out a solid state post-condensation at temperatures around 200° C. This consists in heating a load of polymer granules. This solid state low temperature procedure permits especially the obtention of polymers at low degradation levels.

Du Pont de Nemours company, especially in U.S. Pat. No. 5,548,868 and U.S. Pat. No. 5,510,454 describes another method for obtaining polyesters. This method consists in producing prepolymer tablets presenting low degrees of polymerization, ranging between 2 and 40. The tablets are subsequently condensed to solid state according to the procedure previously described for post-condensation. It is possible through this method to obtain polymers of any molecular weight, having viscosity indexes under or over about 85 ml/g, according to the post-condensation operational conditions.

The previously described solid state condensation and post-condensation procedures present considerably low kinetics and constitute a limiting step in the manufacture of polyesters. Notwithstanding the progresses attained, constant efforts are being made in order to improve the performance of the solid phase condensation or post-condensation step.

The object of the present invention is to overcome the problems inherent to solid phase condensation by proposing a process which permits increasing the kinetics of solid phase condensations. It proposes an alternative to known processes through effecting a solid phase condensation dispersed in a liquid. This permits overcoming the difficulties encountered in the usual processes, increasing the condensation kinetics and hence attaining faster the desired degrees of polymerization. The accomplishment of the solid phase condensation in a liquid medium must be effected on a solid prepolymer having particular properties, necessary for the good conduction of the process and speeding up of the kinetics. The object of the invention however is also a process for obtaining the prepolymer in solid phase dispersed to be condensed, as well as the characteristics, particularly the crystalline characteristics which permit making it sufficiently reactive.

The invention presents a process for manufacturing polyester which comprises at least the steps described above. It may comprise other upstream, downstream or intermediate steps. The process steps may be effected continuously or discontinuously in separate devices, or in the same devices. The essential steps are the following:

a) esterifying or transesterifying a carboxylic diacid or a carboxylic acid diester with a diol,
b) prepolymerizing the esterification or transesterification product in liquid phase until an average degree of polymerization between 10 and 50, preferably between 20 and 45,
c) preparing a dispersion of the prepolymer in a non-solvent of diol and non-swelling of the prepolymer liquid, the prepolymer being present in the dispersion in the form of solid particles having diameters under 2 mm and crystallized, with a crystalline lamella thickness under 17 nm,
d) polymerizing in dispersed solid phase,
e) recovering solid particles.

The process may be applied to the polymerization of any carboxylic diacid with any diol. It may be particularly applied with the following diacids: terephthalic acid, isophthalic acid, naphthalenedioic acid, sulfo-5-isophthalic acid and mixtures thereof. It may be applied particularly with the following diols: ethylene glycol, butane diol, neopentyl glycol, diethylene glycol, bisphenols, 1–2 propane diol, cyclohexyldimethanol, and mixtures thereof.

The process may be applied particularly to the synthesis of poly(ethylene terephthalate), from terephthalic acid or methyl terephthalate and diethylene glycol monomers.

Esterification or transesterification step a) is a step commonly carried out in the polyester manufacturing industrial processes. Two routes for example are mainly employed to manufacture poly(ethylene terephthalate).

The first route of obtention is via said "methyl terephthalate" (DMT). It comprises a transesterification reaction. Molten DMT is solubilized in ethylene glycol (EG) present in excess, the molar ratio EG/DMT being about 1.9 to 2.2, and the reaction is carried out under atmospheric pressure and at temperatures around 130° C. to 250° C. A catalyst such as for example manganese acetate must be present. The methanol during the reaction is eliminated through destilation. The ethylene glycol present in excess is eliminated by evaporation after the transesterification reaction. The catalyst which is also a degradation catalyst of the polyester is blocked with the aid of phosphorous compounds after the reaction. The product resulting from the transesterification is a blend of bis-hydroxyethyl-terephthalate (BHET) oligomers.

The second route is the route called "direct esterification". It refers to an esterification reaction of terephthalic acid with ethylene glycol. It is carried out at temperatures between 130° C. and 280° C. Terephthalic acid, molten at such temperatures, is not soluble in the ethylene glycol but is so in the ester product of the reaction. However the solubilization of the reagent in the medium is progressive. The ethylene glycol is present in a molar ratio EG/terephthalic acid around 1 to 3. From this reaction results a mixture of oligomers having end functions in the form of terephthalic acid or of hydroxyethyl terephthalate.

The utilization of such processes are the object of several studies described in literature. The above-indicated conditions do not constitute a limitation to the scope of the present invention.

The subsequent solid phase prepolymerization and polymerization steps are condensation polymerization steps. They are generally catalyzed with the aid of metal compounds, for example antimony, titanium or germanium compounds. They may be catalyzed by any polycondensation catalyst of the prior art.

Liquid phase prepolymerization step b) may be accomplished preferably by two modes. The first mode for carrying out this step is to carry out the prepolymerization in molten phase. The second mode therefor consists in effecting the prepolymerization of the molten phase dispersed in a liquid medium. The way for accomplishing these two embodiments will be described subsequently. The prepolymer obtained presents an average degree of polymerization between 10 and 50, preferably between 20 and 45.

By "average degree of polymerization" it is to be understood the absolute average polymerization degree defined by the following formula:

$$DP_n = \frac{1}{M_o} * \frac{\sum_i n_i M_i}{\sum_i n_i} = \frac{M_n}{M_o}$$

where $M_0$ is the molecular weight of the repetitive portion of the polymer, $M_i$ is the molecular weight of the referenced chain length i, and $n_i$ is the number of referenced chain lengths. The molecular weights are absolute molecular weights.

The average degree of polymerization is related to the absolute number average molecular weight $M_n$, according to the formula above. The latter is is evaluated by Gel Permeation Chromatography (GPC) with viscosimetrical coupling.

The viscosity of the polymer in solution is associated with the length of the chains and hence the number average molecular weight and with the average degree of polymerization. It is an indicator of the advancement of the polymerization.

In the present document, viscosity index (VI) is to be understood as the viscosity in ml/g measured at 25° C. with the aid of a Ubbelohde-type viscosimeter for a 0,005 g/ml solution of polymer dissolved at 115° C. in a mixture composed of 50% by weight of phenol and 50% by weight of 1-2 dichlorobenzene. For PET, an interrelation between the viscosity index and the average degree of polymerization evaluated by GPC was established:

$DP_n=1.19*VI-7$, wherein VI is in ml/g.

This interrelation is valid for viscosity indexes comprised between 10 and 70 ml/g.

Step c) consists in preparing a dispersion of the prepolymer obtained from step b). The dispersed prepolymer is in the form of dispersed particles. The dispersion liquid used must not be a solvent of the diol and must not be a swelling medium of the prepolymer. For the accomplishment of the subsequent polymerization in dispersed solid phase, the solid particles must have a diameter under about 2 mm, preferably 1 mm, and crystallized with crystalline lamellas about 17 nm thick, preferably under about 12 nm. The formation of the solid particle dispersion may be carried out according to several modes. The modes to form the dispersion depend particularly on the mode for carrying out the prepolymerization step. Two modes for forming the dispersion can be considered: a first mode for preparing the dispersion consists in solidifying the prepolymer in a particulate form and isolating it (first phase) and then placing the particles in the presence of the dispersion medium (second phase). A second mode for effecting the dispersion consists in effecting the two phases simultaneously, the solidification of the prepolymer occurring within the dispersion medium. These modes for accomplishment will be detailed subsequently.

Step d) of solid phase polymerization dispersed in a liquid medium permits obtaining high polymerization kinetics in that case where the solid particles of the prepolymer present the characteristics described above, and obtained through the procedures described for example in the present document.

The step of solid phase polymerization dispersed in a liquid medium must be effected in a medium which does not dissolve the diol to be reacted and neither swell the prepolymer. More particularly, for the manufacturing of poly (ethylene terephthalate), the medium must not be an ethylene glycol solvent. This characteristic is meant to permit the elimination of the diol and accelerate the polymerization reaction. As adequate liquids to carry out the invention, one can mention hydrocarbonated compounds. These compounds can be obtained for example from a fraction of aliphatic hydrocabons having a number of carbon atoms under or equal to 20. The hydrocarbon fraction may be a liquid product under atmospheric pressure and at the dispersed phase polymerization temperature. The dispersed solid phase condensation may also be advantageously be accomplished in a gaseous hydrocarbon fraction at atmospheric pressure at a temperature above 150° C. and maintained in liquid state under pressure during the dispersed solid phase polymerization. Such a medium is eliminated by fractionation at the end of the process, in order to recover the polymer.

The elimination of the diol from the medium is facilitated through entrainment by a flow of inert gas. The gas may be advantageously introduced by bubbling in the dispersion medium. It may be selected from nitrogen, rare gases, inert gases such as for example nitrogen-enriched air, carbon dioxide, and mixtures thereof. The presence of the inert gas permits to further avoid any presence of oxygen within the medium and thus avoid the degradation of the polyester. The entrained dispersion medium may be recycled to the reaction medium after collection and separation of the diol.

In order to stabilize the dispersion of solid particles of the prepolymer to be condensed, it is possible, without this having to constitute a limitation of the described process, to add to the medium an agent. This stabilizing agent is advantageously a compound having surface-active properties comprising a polar portion and a non-polar portion and not comprising any function reactive in the medium. It may be chosen for example from protected poly(ethoxylated) alkyl-phenols, for example protected poly(ethoxylated) nonyl-phenol, and protected poly(ethoxylated)alkanes. The protection is obtained through alkoxylation, through a pentoxylation for the poly(ethoxylated)nonyl-phenols or through a methoxylation for the poly(ethoxylated)alkanes. As an example of a protected poly(ethoxylated)alkane one can mention a 11 to 12 times ethoxylated $C_{14}$ alkane. The dispersed solid phase polymerization is carried out at temperatures at which the dispersed particles are in the solid state. The temperature may vary during the advancement of the reaction, generally increasing, but must always remain under the temperature which provokes the melting of the most fusible particles in the medium. The presence of particles in the molten state facilitates the particle aggregation phenomena and reduces the polymerization speed. For example the dispersed solid phase polymerization may be carried out at a temperature 10° C. lower than the melting temperature of the dispersed polymer.

The dispersion is characterized in that the solid particles have a diameter lower than 2 mm. By diameter it is to be understood the average diameter of the dispersed particles. Preferably the diameter of the solid particles is lower than 1 mm.

The dispersed particles must present particular crystalline characteristics for the accomplishment of a dispersed solid phase condensation. The thickness of the crystalline lamellas of the particles must be lower than about 17 nm and preferably around 12 nm.

By crystalline lamellas thickness it should be understood the length measured by wide-angle difraction (WAXS) according to the following references:

N. S. Murphy and H. Minor, "General procedure for evaluating amorphous scattering scans crystallinity from X-ray diffraction scans of semicrystalline polymers", Poly, vol. 31, 996–1002 (1990).

This method consists in pinpointing the diffraction corresponding to the crystalline reflection on the Miller indexes plan (010) at a 2β angle of 17.8°. The average dimension $ACS_{010}$ of the crystal is given by the Scherrer equation:

$$ACS_{010}=k*l/(a*\cos\beta),$$

wherein k-0.9, l is the wave length of copper, a is the width at mid-height in radians of the peak of diffraction.

The formation of solid particles and their dispersion in the prepolymer non-solvent and non-swelling dispersion medium, simultaneously or subsequently, may depend on the mode for carrying out the prepolymerization step b). Two modes of carrying out the prepolymerization are adequate for realizing the invention.

The first prepolymerization mode is a prepolymerization in a molten phase dispersed in droplets in a liquid medium. It is accomplished placing a product such as that obtained through step a), molten, in contact with a heated liquid medium, to which a catalyst is eventually added. This medium must not be a solvent of the compounds involved. The medium may be exactly the same as that applied for the subsequent dispersed solid state polymerization. It may be different from that which shall be used subsequently. It may thus be constituted from the same types of components, hydrocarbons for example, be identically submitted to a gas flow, and contain one or more stabilizers. The addition of a stabilizer may permit furthermore a better control of the dispersion of the molten prepolymer and avoid the coalescence of the droplets. The use of an 11 to 12 times ethoxylated and methoxylation-protected $C_{14}$ alkane gives particularly remarkable results. The characteristics of the media have been described in detail above. The reaction temperature must be controlled in order to maintain the compound to be polymerized in a molten state, for example above 220° C. It may be increased during the reaction period, for example until about 260° C. The prepolymerization is carried out until the obtention of an average degree of polymerization comprising between 10 and 50, preferably between 20 and 45. At this stage of the process, the prepolymerization product is dispersed in the molten state in a dispersion medium at a temperature above the melting temperature of the prepolymer. The second prepolymerization mode is a molten state prepolymerization. It is carried out by heating the product of the type obtained in step a), to which a catalyst is eventually added, the product being in the liquid state and constituting the mass of the medium. The molten phase prepolymerization may be carried out as follows: a mixture of the compound to be prepolymerized and the catalyst is heated until a temperature above the melting temperature of said compound, above 200° C., preferably above about 260° C. The reaction may be advantageously carried out under reduced pressure in order to favour the separation of ethylene glycol, and eventually water since the precursor employed in step a) is a carboxylic diacid. It may eventually be carried out with a sweep or bubble of inert gas. This facilitates the elimination of the ethylene glycol present in the medium. The prepolymerization is carried out until the obtention of an average degree of polymerization comprising between 10 and 50, preferably between 20 and 45. At this stage of the process the prepolymerization product is in a molten state isolated from any dispersion medium.

The prepolymerization product according to the mode of accomplishment in molten phase may be transformed into a state of crystallized solid particles and dispersed according to several modes. The crystallization is carried out at a temperature comprised within the range of crystallization temperatures of the prepolymer. This range lies within the following temperatures: glass transition temperature plus 25% of the difference between the melting and glass transition temperatures and melting temperature minus 25% of the same difference.

A first mode consists in rapidly solidifying the molten prepolymer and making it into solid particles with a diameter under 2 mm, preferably 1 mm, then placing the particles obtained in contact with the non-solvent of diol dispersion medium. The conformation may be effected for example by grinding or by cutting reed-shaped bodies having sections under 2 mm, preferably 1 mm. A second mode consists in spraying the prepolymerization product in a gaseous fluid at a temperature within the range of the crystallization temperatures of the prepolymer. The spraying must be effected in the form of droplets under 2 mm diameter, preferably 1 mm. The droplets solidified by contact with the gas are then put in contact with the non-solvent of diol and non-swelling of the prepolymer dispersion medium. A third mode of accomplishment consists in spraying the prepolymerization product in the non-solvent of diol and non-swelling of the prepolymer dispersion medium, said medium being at a temperature comprised within the range of the crystallization temperatures of the prepolymer. A fourth mode of accomplishment comprises a first phase which consists in spraying the prepolymerization product in the non-solvent of diol and non-swelling of the prepolymer dispersion medium, said medium being at a temperature above the melting temperature of the prepolymer. After this first phase, the prepolymerization product is dispersed in a molten state in a dispersion medium at a temperature above the melting temperature of the prepolymer.

Once the prepolymerization product is dispersed in the molten state in a dispersion medium at a temperature above the melting temperature of the prepolymer, proceeding it either from the first phase of the fourth dispersion mode after a molten phase prepolymerization, or from a molten phase prepolymerization dispersed in a liquid medium, the accomplishment of the dispersion may be effected mainly according to two modes of operation. According to a first mode of operation, the dispersion medium is rapidly cooled down to a temperature comprised within the range of the crystallization temperatures of the prepolymer. This cooling down may be effected for example by dilution with a cold liquid constituting the dispersion medium. The product obtained from this cooling is the suspension of solid particles in a non-solvent of diol non-swelling of the prepolymer liquid. A second mode of operation may applied if the liquid medium for dispersion of the molten phase is a gaseous product at a temperature above 150° C. and maintained under pressure in the liquid state. This mode consists in submitting the medium to a temperature maintained in the range between the the crystallization temperatures of the prepolymer and to thus solidify the polymer initially molten in suspension. The particles are then placed in contact with the non-solvent of diol non-swelling of the prepolymer dispersion medium.

The connection within the same medium of the steps of dispersed molten phase prepolymerization, the effecting of the dispersion of the solid particles and the dispersed solid phase polymerization is a particularly simple and effective mode of accomplishment.

Step e) is a step during which the polymerization product in solid phase dispersed in a liquid medium is isolated from the dispersion medium. The isolation may be effected by any means which permits the separation of a liquid phase from a solid phase in suspension. The isolation may consist for example in a filtration, a decantation or an unstabilization of the dispersion. If the dispersion medium is a liquid medium constituted of a gaseous compound at atmospheric pressure liquefied under pressure, the isolation may be effected through retention of the medium.

The solid particles may be washed with any appropriate compound and then dried. As a washing compound one can mention for example heptane.

The solid particles can be used directly for applications, for instance for extrusion, or can be compacted into tablets or granules.

Other details and advantages of the invention shall become clearer from the examples given hereunder for illustration purposes only.

EXAMPLE 1

A poly(ethylene terephthalate) prepolymer having a viscosity index (initial VI) of 42 ml/g, that is, having an average degree of polymerization of 43, is prepared according to a classic direct esterification procedure, in molten phase, from purified terephthalic acid and ethylene glycol, in the presence of 250 ppm of catalyst. The catalyst used is antimonium oxide.

The prepolymer is solidified in mass and then ground with dry ice. The ground product is then sieved. The different granulometries are separated in samples where the particles have diameters comprised between 125 and 250 μm, 250 and 500 μm, 500 and 1000 μm. The sieved powders are dried under vacuum at 130° C. during 3 hours. The thickness of the crystalline lamellas is measured: 11,5 nm.

The powders are dispersed in 100 ml of a fraction of hydrocarbons $C_{14}$ to $C_{17}$ (commercialized by the société Halterman) in a 0.5 l round reactor equipped with an agitation system, a Dean Stark type condenser coupled to a refrigerant, a thermocouple, an argon inlet surmounted by a samplpe collecting chamber maintained under argon. The ratio of solid introduced (weight of solid prepolymer introduced in powered form relative to the weight of the dispersant medium) is of 6.2%.

The reactor is heated. The temperatures within the dispersion medium are measured with th aid of a thermocouple. The dispersed solid phase polymerization is effected at different heating temperatures for a size of particles comprised within 125 and 250 μm. The advancement of the polymerization is measured through the evolution of the viscosity index (VI). Table 1 presents the viscosity indexes measured after about 8 hours (8 hour VI) polymerization in dispersed solid phase for heating temperatures from 230° C. to 240° C.

The polymer is recovered by filtration. The polymer powder obtained is rinsed several times with heptane and dried under vacuum at 70° C. during a couple of hours.

TABLE 1

| Heating Temperature | Initial $DP_n$ | Initial VI (ml/g) | 8 hour VI (ml/g) |
|---|---|---|---|
| 200° C. | 43 | 42 | 77 |
| 220° C. | 43 | 42 | 107 |
| 230° C. | 43 | 42 | 134 |
| 240° C. | 43 | 42 | 180 |

Dispersed solid phase polymerizations are effected according to the same mode of accomplishment, at a temperature of 220° C., for different sizes of particles isolated through sieving. Table 2 presents the viscosity indexes measured after about 8 hours (8 hour VI) of dispersed solid phase polymerization for particle sizes respectively comprised between 125 and 250 μm, 250 and 500 μm, 500 and 1000 μm.

TABLE 2

| Particle Sizes | Initial $DP_n$ | Initial VI (ml/g) | 8 hour VI (ml/g) |
|---|---|---|---|
| 125–250 | 43 | 42 | 107 |
| 250–500 | 43 | 42 | 100 |
| 500–1000 | 43 | 42 | 95 |

Comparative Examples

The efficacy of a polymerization in solid phase dispersed in a liquid medium with the efficacy of a classical solid phase condensation in a gaseous medium (classical post-condensation) are being compared.

A solid phase condensation in a gaseous medium is effected with a prepolymer powder having a viscosity index of 42 ml/g, a thickness of crystalline lamellas of 11.5 nm, and particle sizes comprised between 125 and 250 μm. This powder is obtained according to the mode of accomplishment described in example 1.

The powder is placed in a 100 ml round flask fixed on to a device permitting it to rotate about its axis. The rotating round flask is dipped into a silicone oil bath heated such that the powder temperature is 220° C. The system is sweeped by a current of nitrogen. The advancement of the condensation is measured through the evolution of the viscosity index (VI). Table 3 presents the viscosity indexes measured after approximately 8 hours (8 hour VI) of condensation either it being a solid phase dispersed in a gaseous medium, or a solid phase dispersed in a liquid medium. The solid phase condensation dispersed in a liquid medium is effected under the same conditions, at 220° C., and on a powder having granule sizes comprised between 125 and 250 μm. This embodiment is described in example 1.

Table 4 presents the results obtained according to identical embodiments, at a condensation temperature of 200° C.

TABLE 3

| Solid phase condensation | Initial VI (ml/g) | Initial $DP_n$ | 8 hour VI (ml/g) |
|---|---|---|---|
| Dispersed in gas medium | 42 | 43 | 90 |
| Dispersed liquid medium | 42 | 43 | 107 |

TABLE 4

| Solid phase condensation | Initial VI (ml/g) | Initial $DP_n$ | 8 hour VI (ml/g) |
|---|---|---|---|
| Dispersed in gas medium | 42 | 43 | 68 |
| Dispersed liquid medium | 42 | 43 | 77 |

EXAMPLE 2

Condensations were effected with the prepolymers having different degrees of polymerization (Initial $DP_n$). The thickness of the crystalline lamellas (e) is measured and presented in table 5. These prepolymers are prepared in the same way as in the preceding examples. The solid phase condensations dispersed in a gaseous medium (CS) and solid phase dispersed in a liquid medium (CSd) are effected according to the same procedure.

The conditions for accomplishment are the following:

particle size: 125 mm to 250 mm condensation temperature: 220° C.

TABLE 5

| Initial $DP_n$ | e(nm) | Initial VI | CS VI (8 hours) | CSd VI (8 hours) |
|---|---|---|---|---|
| 31.5 | 10.5 | 29.5 | 77 | 110 |
| 43 | 11.5 | 42 | 90 | 107 |

EXAMPLE 3

This example illustrates a mode of accomplishment according to which the prepolymerization is effected in molten phase dispersed in a liquid medium.

A 0.5 l round reactor, equipped with an agitation system, a Dean Stark type condenser coupled to a refrigerant and to a dosing chamber, a thermocouple, an argon inlet surmounted by a sample collecting chamber maintained under argon.

100 g of the product obtained from the esterification of terephthalic acid (TPA) with ethylene glycol are loaded into the reactor. It is melted and, relative to the initial weight of TPA, 270 ppm of antimony acetate diluted in ethylene glycol introduced into the molten transesterification product with the aid of a syringe. With the aid of a 100 ml dosing chamber a fraction of $C_{14}$ to $C_{17}$ hydrocarbons is introduced previously heated to 250° C.

A constant consumption of 15 ml/s of argon is maintained in the reactor during the synthesis. The synthesis is effected at atmospheric pressure. The reactor is heated with the aid of a silicone oil bath. The temperature is maintained at 250° C. during 2 hours. The product is in a molten state dispersed in the fraction.

A tempering is effected by adding fraction at 20° C., realizing a dilution by 4. The entire liquid-liquid suspension is then dispersed in solid prepolymer particles within the liquid medium. The prepolymer obtained is washed with heptane at 70° C. under vacuum during a couple of hours. It is then sieved to diameters under 250 μm.

20 g of prepolymer powder thus prepared and 200 ml of hydrocarbon fractions are introduced in the reactor. The temperature of the reactor is then increased to 220° C. This temperature is maintained during 8 hours. During condensation, ethylene glycol (by-product of the reaction) and the fraction are entrained by a current of argon. They condense in the Dean Stark or a phase separation permits collecting the ethylene glycol while the supernatant (the fraction) remains in the reactor, thus permitting maintaining a constant dilution of the polymer in the diluent medium.

After eight hours of condensation the polymer powder obtained is rinsed several times with heptane and dried under vacuum at 70° C. during a couple of hours. The viscosity indexes (VI) and crystalline lamella thicknesses are evaluated for the prepolymer (after the tempering), and then for the polymer after eight hours of condensation in solid phase dispersed in a liquid medium. The results are presented in table 6.

TABLE 6

| | VI (ml/g) | $DP_n$ | Thickness of Lamellas (nm) |
|---|---|---|---|
| Prepolymer | 24.7 | 22 | 5.7 |
| Polymer (8 hours) | 66 | 71.7 | 6 |

What is claimed is:

1. A process for manufacturing polyester, comprised of the following steps:

a) esterifying or transesterifying a carboxylic diacid or a carboxylic acid diester with a diol, b) prepolymerizing the esterification or transesterification product in liquid phase to provide an average degree of polymerization of between 10 and 50, c) preparing a dispersion of the prepolymer in a non-solvent of diol and non-swelling of the prepolymer liquid, the prepolymer being present in the dispersion in the form of solid particles having diameters under 2 mm and crystallized, with a crystalline lamella thickness under 17 nm, d) polymerizing in dispersed solid phase, e) recovering solid particles.

2. The process of claim 1, wherein the carboxylic diacids are selected from terephthalic acid, isophthalic acid, naphthalenedioic acid, sulfo-5-isophthalic acid and mixtures thereof.

3. The process of claim 1 wherein the diol is selected from ethylene glycol, butane diol, neopentyl glycol, diethylene glycol, bisphenols, 1-3 propane diol, 1-2 propane diol, cyclohexyldimethanol, and mixtures thereof.

4. The process of claim 1 wherein prepolymerization step b) is catalyzed.

5. The process of claim 1 wherein dispersed solid phase polymerization step d) is catalyzed.

6. The process of claim 1 wherein the thickness of the crystalline lamellas of the solid particles obtained from step c) is under than 12 nm.

7. The process of claim 1 wherein the diameter of the solid particles obtained from step c) is under 1 nm.

8. The process of claim 1 wherein the solid particle dispersion liquid medium is a hydrocarbon fraction.

9. The process of claim 8, wherein the compounds of the hydrocarbon fraction are aliphatic and have a number of carbon atoms under 20.

10. The process of claim 9, wherein the hydrocarbon fraction is a liquid product at atmospheric pressure and at the dispersed phase polymerization temperature.

11. The process of claim 8 wherein the hydrocarbon fraction is a gaseous product at atmospheric pressure at a temperature above 150° C. and wherein the medium is maintained under pressure in liquid state during the dispersed phase polymerization step.

12. The process of claim 1 wherein the dispersion medium contains a stabilizing compound having surface-active properties.

13. The process of claim 12, wherein the compound having surface-active properties is selected from protected poly(ethoxylated)alkyl phenols and protected poly(ethoxylated)alkanes.

14. The process of claim 1 wherein the dispersed solid phase polymerization is carried out in a flow or inert gas.

15. The process of claim 14, wherein the flow of inert gas is introduced by bubbling in the liquid dispersion medium.

16. The process of claim 14 wherein the inert gas is selected from rare gases, inert gases nitrogen-enriched air, carbon dioxide and mixtures thereof.

17. The process of claim 1 wherein the dispersed solid phase polymerization is carried out at temperatures under the melting temperature of the most fusible particles present in the medium.

18. The process of claim 1 wherein the polymerization is effected in molten phase dispersed in a liquid medium.

19. The process of claim 18, wherein the molten phase dispersion medium contains a stabilizing compound having surface-active properties.

20. The process of claim 19, wherein the surface-active compound is selected from protected poly(ethoxylated)alkyl phenols and protected poly(ethoxylated)alkanes.

21. The process of claim 18 to wherein the dispersed solid phase polymerization is carried out in a flow of inert gas.

22. The process of claim 21, wherein the flow of inert gas is introduced by bubbling in the liquid dispersion medium.

23. The process of claim 21 wherein the inert gas is selected from rare gases, inert gases, nitrogen-enriched air, carbon dioxide and mixtures thereof.

24. The process of claim 18 wherein the molten phase dispersion liquid medium is a hydrocarbon fraction.

25. The process of claim 24, wherein the compounds of the hydrocarbon fraction are aliphatic and have a number of carbon atoms under 20.

26. The process of claim 25, wherein the hydrocarbon fraction is a liquid product at atmospheric pressure and at the dispersed phase polymerization temperature.

27. The process of claim 24 wherein the hydrocarbon fraction is a gaseous product at atmospheric pressure at a temperature above 150° C. and wherein the medium is maintained under pressure in liquid state during the dispersed phase polymerization step.

28. The process of claim 18, wherein the dispersed molten phase prepolymerization and the dispersed solid phase polymerization steps are carried out in the same liquid medium according to claim 1.

29. The process of claim 1 wherein the prepolymerization step is carried out in molten phase.

30. The process of claim 29, wherein step c) comprises a phase of fast solidification of the molten prepolymer, a phase of forming particles with an inner diameter of 2 nm and a phase of placing granules or particles in contact with the dispersion medium.

31. The process of claim 30, wherein the formation of particles is effected through grinding.

32. The process of claim 31, wherein the solidification is effected in the form of reed-shaped bodies having sections under 2 mm and wherein the formation of particles is effected by section of said reeds.

33. The process of claim 29, wherein step c) comprises a phase of forming solid prepolymer particles by spraying the prepolymer in molten state in the form of droplets having an internal diameter under 2 mm, in a gaseous fluid at a temperature within the range of the temperatures of crystallization of the prepolymer and a phase put in the presence of solid particles obtained with the dispersion medium.

34. The process of claim 29, wherein step c) comprises a phase of forming solid prepolymer particles by spraying the prepolymer in molten state in the form of droplets having an internal diameter under 2 mm, in a liquid fluid according to claim 8, the temperatures being in the range of the crystallization temperatures of the prepolymer.

35. The process of claim 29, wherein step c) comprises a phase of spraying prepolymer in molten state, in the form of droplets having an internal diameter under 2 mm, in a liquid at a temperature above the melting temperature of the prepolymer, and a solidification and crystallization phase.

36. The process of claim 35, wherein the liquid is the dispersion medium of dispersed solid phase polymerization step d) according to claim 8.

37. The process of claim 35, wherein the liquid is a gaseous fraction of hydrocarbons at atmospheric pressure at a temperature above 150° C., maintained in liquid state under pressure.

38. The process of claim 27 wherein the dispersion is effected by solidifying the droplets by maintaining the liquid medium at atmospheric pressure followed by contacting the solid particles obtained with the dispersion medium.

39. The process of claim 18 wherein step c) comprises a phase of solidifying the suspension of molten prepolymer by cooling to a temperature comprises within the range of crystallization temperatures of the prepolymer.

40. The process of claim 39, wherein the cooling is effected by dilution with cold dispersion liquid.

41. The process of claim 1 wherein the step of prepolymerizing is carried out to provide an average degree of polymerization of between 20 and 45.

* * * * *